Oct. 17, 1933.   A. S. MARTHENS   1,930,528
CONTROL APPARATUS
Filed Feb. 3, 1931   2 Sheets-Sheet 1

WITNESSES:

INVENTOR
Arthur S. Marthens
BY
ATTORNEY

Oct. 17, 1933.     A. S. MARTHENS     1,930,528
CONTROL APPARATUS
Filed Feb. 3, 1931     2 Sheets-Sheet 2

WITNESSES:
Leon J. Jaza
W. S. Chilcott

INVENTOR
Arthur S. Marthens
BY
Wesley G. Carr
ATTORNEY

Patented Oct. 17, 1933

1,930,528

UNITED STATES PATENT OFFICE 1,930,528

CONTROL APPARATUS

Arthur Shipley Marthens, Wilkinsburg, Pa., assignor to Westinghouse Electric & Manufacturing Company, a corporation of Pennsylvania Application February 3, 1931. Serial No. 513,132

5 Claims. (Cl. 200—87)

My invention relates to control apparatus and particularly to control relays of the electro-magnetic type.

In view of the limited space on electrically propelled cars it is not common practice to provide a circuit breaker having sufficient rupturing capacity to interrupt the current which flows in case of a short circuit in the electrical apparatus.

Circuit breakers are usually provided in sub-stations, which are located at intervals along the railway system, for the purpose of sectionalizing the trolley feeder system. When a fault occurs on the system, the circuit breakers in the nearest sub-stations are opened, thereby isolating the section in which the fault is located. Since all service is interrupted over the entire section when the sub-station breakers are opened, it is desirable to isolate the car on which the fault has occurred as quickly as possible, in order that the sub-station breakers may be reclosed to restore power to the system.

An electric locomotive may be disconnected from the power source by lowering the pantograph which is utilized for collecting current from the trolley conductor. However, the pantograph collector should not be disconnected from the trolley conductor when an abnormal current is flowing, as an arc would be established which would be injurious to both the pantograph and the trolley conductor.

Therefore, it is necessary to provide a means for preventing the pantograph from being lowered until after the circuit breaker in the sub-station has been opened and has disconnected the trolley conductor from the power source. However, the pantograph should be lowered as soon as power is removed from the trolley conductor, in order to isolate the car on which the fault has occurred, to permit the sub-station breaker to be reclosed to restore power to the trolley conductor.

Patent No. 1,428,837, issued September 12, 1922 to A. H. Candee and L. J. Hibbard, and assigned to the Westinghouse Electric and Manufacturing Company, describes a relay adapted for so controlling an electro-responsive device as to preclude its operation under predetermined conditions and to insure its operation under other predetermined conditions. A relay of the type described in the foregoing patent is suitable for controlling the operation of the pantograph of an electrically operated vehicle under the above-described conditions.

However, the relay described in Patent No. 1,428,837 requires an operating coil to actuate the relay armature and also a current transformer for energizing the operating coil of the relay, which add to the cost of manufacturing and installing the equipment required on a locomotive.

An object of my invention is to provide an electro-magnetic relay which shall be simple and efficient in operation and which may be economically manufactured and installed.

A more specific object of my invention is to provide an electro-magnetic relay which shall not require an operating coil to actuate the relay armature and a current transformer for energizing the operating coil.

Other objects of my invention will be explained fully hereinafter or will be apparent to those skilled in the art.

For a fuller understanding of the nature and scope of my invention, reference may be had to the following detailed description, taken in conjunction with the accompanying drawings, in which.

Figure 1:
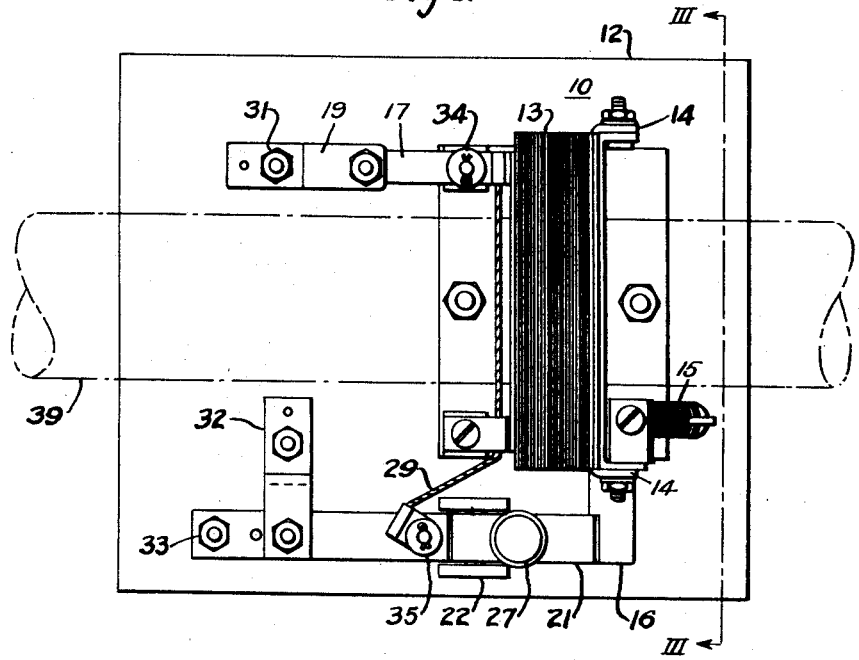
Figure 1 is a plan view of a relay constructed in accordance with my invention.

Referring to the drawings, the relay 10 comprises a hollow rectangular core 11 which is mounted upon an insulating panel 12. In order to provide a relay which will respond quickly, a laminated core 11 is utilized, since it will prevent the flow of induced eddy currents.

As shown, one side of the rectangular core constitutes an armature 13 which is pivotally mounted upon the core 11 by means of brackets 14. The armature 13 is normally biased to its open position by a tension spring 15, one end of which is fastened to the panel 12, the other end being connected to a latch arm 16 which is fastened to the armature 13.

A contact member 17 is carried by the armature 13 and is disposed to engage a fixed contact member 18 when the armature 13 is in its open position. The contact member 18 is supported by a bracket 19 which is attached to the base 12. A contact arm 21 is pivotally mounted on a support 22 that is also mounted upon the base 12.

A contact member 23 is resiliently connected to one end of the contact arm 21.

It will be observed that the contact member 23 is so interposed between two fixed contact members 24 and 25 that it alternately engages them as the contact arm 21 is oscillated back and forth. The contact arm 21 is biased to a position in which the contact member 23 engages the fixed contact member 25 by a compression spring 26 that is interposed between the arm 21 and the base 12.

Figure 2:
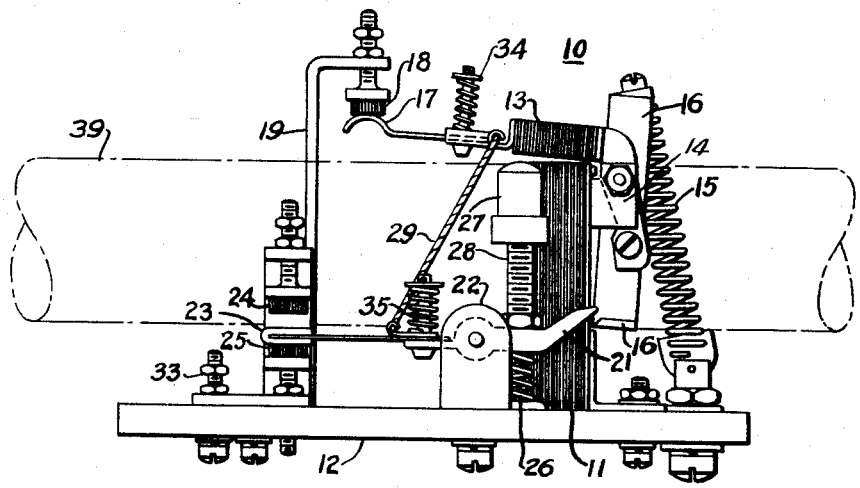
Fig. 2 is a view, in side elevation, of the relay shown in Fig. 1.
Figure 3:
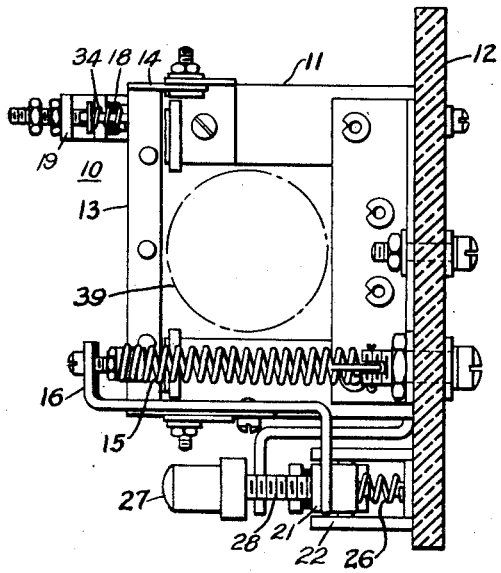
Fig. 3 is a sectional view, taken along the line III—III of Fig. 1.

Referring particularly to Fig. 2, it will be seen that the contact arm 21 is so mounted that its end may be engaged by the lower end of the latch arm 16 to retain the contact member 23 in engagement with the contact member 24.

In Fig. 2, the contact arm 21 is shown in the unlatched or tripped position, in which the contact member 23 engages the contact member 25. A reset button 27, which is attached to the contact arm 21 by means of a threaded stud 28, is provided for manually depressing the contact arm to a position in which its end is retained underneath the lower end of the latch arm 16. When the contact arm 21 is once set in the latched position, it will be retained in that position until the armature 13 is actuated toward the core 11, thereby moving the lower end of the arm 16 to the right into a position in which the arm 21 is disengaged and biased upwardly by the spring 26.

A flexible conductor 29 is provided for connecting the contact member 23 to the contact member 17. Terminal studs 31, 32 and 33 are provided on the base 12 by means of which connections may be made to the fixed contact members 18, 24 and 25, respectively. Spring mountings 34 and 35 are utilized for resiliently mounting the contact members 17 and 23 upon the armature 13 and the contact arm 21, respectively.

Figure 4:
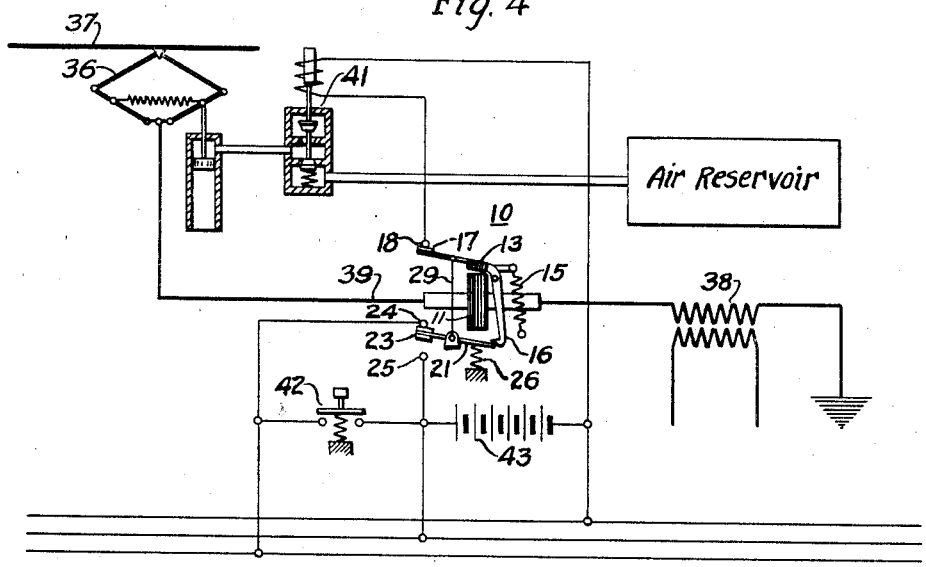
Fig. 4 is a diagrammatic view, showing how the relay may be utilized for controlling the operation of a pantograph.

The operation of the relay may be understood by referring to Fig. 4 of the drawings. A pantograph 36, which may be mounted upon a railway vehicle (not shown), is disposed to engage a trolley conductor 37 to collect current from the trolley for operating the vehicle. The current is conducted from the pantograph 36 to a main transformer 38 by a power conductor 39.

The pantograph 36 may be of a well known type, which is raised by a spring-actuated means and lowered by a pneumatically-actuated means. The operation of the pneumatic means may be controlled by a magnet valve 41 of a standard type. A push button 42 is provided for manually controlling the lowering of the pantograph 36.

In order that the pantograph 36 shall be automatically lowered to disconnect the transformer 38 from the trolley conductor 37, in case of a short circuit in the transformer winding, the relay 10 is provided to control the magnet valve 41. The power conductor 39 is inserted through the hollow rectangular core 11 of the relay 10.

It will be understood that the armature 13 of the relay will be actuated toward the core 11 when a predetermined amount of current flows in the conductor 39. The current setting of the relay may be changed by varying the tension of the spring 15. Since the armature 13 is actuated by the magnetic flux induced in the core 11 by the current flowing in the conductor 39, no operating coil is required on the relay 10 and, therefore, no current transformer is required in the conductor 39 to energize an operating coil.

Assuming that the contact members of the relay 10 are set in the relative positions shown in Fig. 4, and that the pantograph 36 engages the trolley conductor 37, current will be supplied to the main transformer 38 through conductor 39.

The motorman may cause the pantograph to be lowered by depressing the push-button switch 42 to energize the actuating coil of the magnet valve 41. The circuit for the coil extends from the positive terminal of a battery 43, through the push-button switch 42, contact members 24 and 23 of the relay 10, the flexible conductor 29, contact members 17 and 18, and the coil of the magnet valve 41, to the negative terminal of the battery 43.

In case of a short circuit in the main transformer 38, a heavy current will flow through the conductor 39, thereby actuating the armature 13 of the relay 10 to disengage the contact member 17 from the contact member 18. As previously explained, the contact arm 21 is released from engagement with the latch arm 16 when the armature 13 is actuated toward the core 11. Therefore, the contact arm 21 is actuated about its pivot point by the spring 26, and the contact member 23 engages the contact member 25.

Accordingly, the circuit for the coil of the magnet valve 41, which extends through the push button 42 and the contact members 24 and 18 of the relay 10, is interrupted, thereby preventing the pantograph from being lowered while a heavy current is flowing in the conductor 39.

As previously explained, circuit breakers are provided in sub-stations for interrupting the circuit to the trolley conductor in case of a fault on the power system. Therefore, when a fault occurs on a locomotive, the circuit breaker in the nearest sub-station is opened, and all power is removed from the trolley conductor.

As stated before, the relay 10 functions to lower the pantograph 36, as soon as power is removed from the trolley conductor 37, to isolate the car on which the fault has occurred and permit power to be restored to the trolley conductor. As soon as current ceases to flow in the conductor 39, the spring 15 biases the armature 13 to a position in which the contact member 17 engages contact member 18. A circuit is thereby established through the actuating coil of the magnet valve 41 to cause the pantograph 36 to be lowered. This circuit extends from the positive terminal of the battery 43, through contact members 25 and 23 of the relay 10, the flexible conductor 29, contact members 17 and 18, and the coil of the magnet valve 41, to the negative terminal of the battery 43.

In this manner, the relay 10 serves the dual purpose of preventing the pantograph 36 from being lowered while an excessive amount of current is flowing through the pantograph, and causing the pantograph to be lowered as soon as the flow of current through the pantograph is interrupted.

In the type of relay shown, it is necessary to manually reset the relay after it has been tripped. This may be accomplished by pressing the reset button 27 to cause the contact arm 21 to be engaged by the latch arm 16. If it is so desired, a solenoid may be provided for actuating the contact arm 21 instead of the manual reset button 27. The energization of the solenoid coil may be controlled by a push-button switch, located at any convenient place.

Since numerous changes may be made in the above-described construction, and different embodiments of the invention may be made without departing from the spirit and scope thereof, it is intended that all matter contained in the above description, or shown in the accompanying drawing shall be interpreted as illustrative and not in a limiting sense.

I claim as my invention:

1. In an electro-magnetic relay for a power conductor, in combination, a hollow core disposed to receive the power conductor, an armature pivotally mounted on the core and disposed to be actuated when the core is energized by a predetermined amount of current flowing in the power conductor, a spring disposed to bias the armature to the open position, a contact member carried by the armature, a fixed contact member disposed to be engaged by the contact member on the armature when the current flowing in the power conductor is below a predetermined value, a latch arm disposed to be actuated by the armature, a pivotally mounted contact arm disposed to be engaged by the latch arm when the armature is in a predetermined position, a contact member carried by the contact arm, and a fixed contact member disposed to be engaged by the contact member on the contact arm when the contact arm is engaged by the latch arm.

2. In a electro-magnetic relay for a power conductor, in combination, a hollow core disposed to receive the power conductor, an armature pivotally mounted on the core and disposed to be actuated when a predetermined amount of current flows through the power conductor, a spring disposed to bias the armature to the open position, a contact member mounted upon the armature, a fixed contact member disposed to be engaged by the contact member on the armature when the armature is in the open position, a latch arm carried by the armature, a pivotally mounted contact arm disposed to be engaged by the latch arm when the armature is in the open position, a contact member mounted upon the contact arm, a fixed contact member disposed to be engaged by the contact member on the contact arm when the contact arm is engaged by the latch arm, a fixed contact member disposed to be engaged by the contact member on the contact arm when the contact arm is disengaged from the latch arm, and a spring disposed to actuate the contact arm about its pivot point when the contact arm is disengaged from the latch arm.

3. In an electro-magnetic relay comprising a hollow rectangular core disposed to receive a power conductor, one side of the core constituting a pivotally mounted armature disposed to be actuated when a predetermined amount of current flows through the power conductor, a spring disposed to bias the armature to a predetermined position, a contact member carried by the armature, a fixed contact member disposed to be engaged by the contact member on the armature when a predetermined amount of current is flowing in the power conductor, a latch arm disposed to be actuated by the armature, a pivotally mounted contact arm disposed to be engaged by the latch arm when the armature is in a predetermined position, a contact member carried by the contact arm, and a pair of fixed contact members disposed to be alternately engaged by the contact member on the contact arm as the contact arm is alternately engaged by and disengaged from the latch arm.

4. In an electro-magnetic relay comprising a hollow-rectangular core disposed to receive a power conductor, one side of the core constituting a pivotally mounted armature disposed to be actuated when a predetermined amount of current flows through the power conductor, a spring disposed to bias the armature to the open position, a contact member carried by the armature, a fixed contact member disposed to be engaged by the contact member on the armature when the current flowing in the power conductor is below a predetermined value, a latch arm disposed to be actuated by the armature, a pivotally mounted contact arm disposed to be engaged by the latch arm when the armature is in the open position, a contact member carried by the contact arm, a fixed contact member disposed to be engaged by the contact member on the contact arm when the contact arm is engaged by the latch arm, and means for electrically connecting the contact member, carried by the contact arm to the contact member carried by the armature.

5. An electro-magnetic relay comprising a rectangular core disposed to receive a power conductor, one side of the rectangular core constituting a pivotally mounted armature, said armature being disposed to be actuated to the closed position when a predetermined amount of current flows through the power conductor, spring means for biasing the armature to the open position, a contact member resiliently mounted on the armature, a fixed contact member disposed to be engaged by the contact member on the armature when the current flowing in the power conductor is below a predetermined value, a latch arm disposed to be actuated by the armature, a pivotally mounted contact arm having one end disposed to be engaged by the latch arm when the armature is in a predetermined position, a pair of fixed contact members disposed in spaced relation, and a contact member carried by the contact arm and disposed between said fixed contact members to engage one of said contact members when the contact arm is engaged by the latch arm and the other of said contact members when the contact arm is disengaged from the latch arm.

ARTHUR SHIPLEY MARTHENS.